Aug. 1, 1967    R. C. ALLEN, JR    3,334,215
DOMESTIC ELECTRICAL APPLIANCE
Filed Oct. 4, 1963    4 Sheets-Sheet 1

INVENTOR.
Robert C. Allen, Jr.
BY
Frederick M. Ritchie
His Attorney

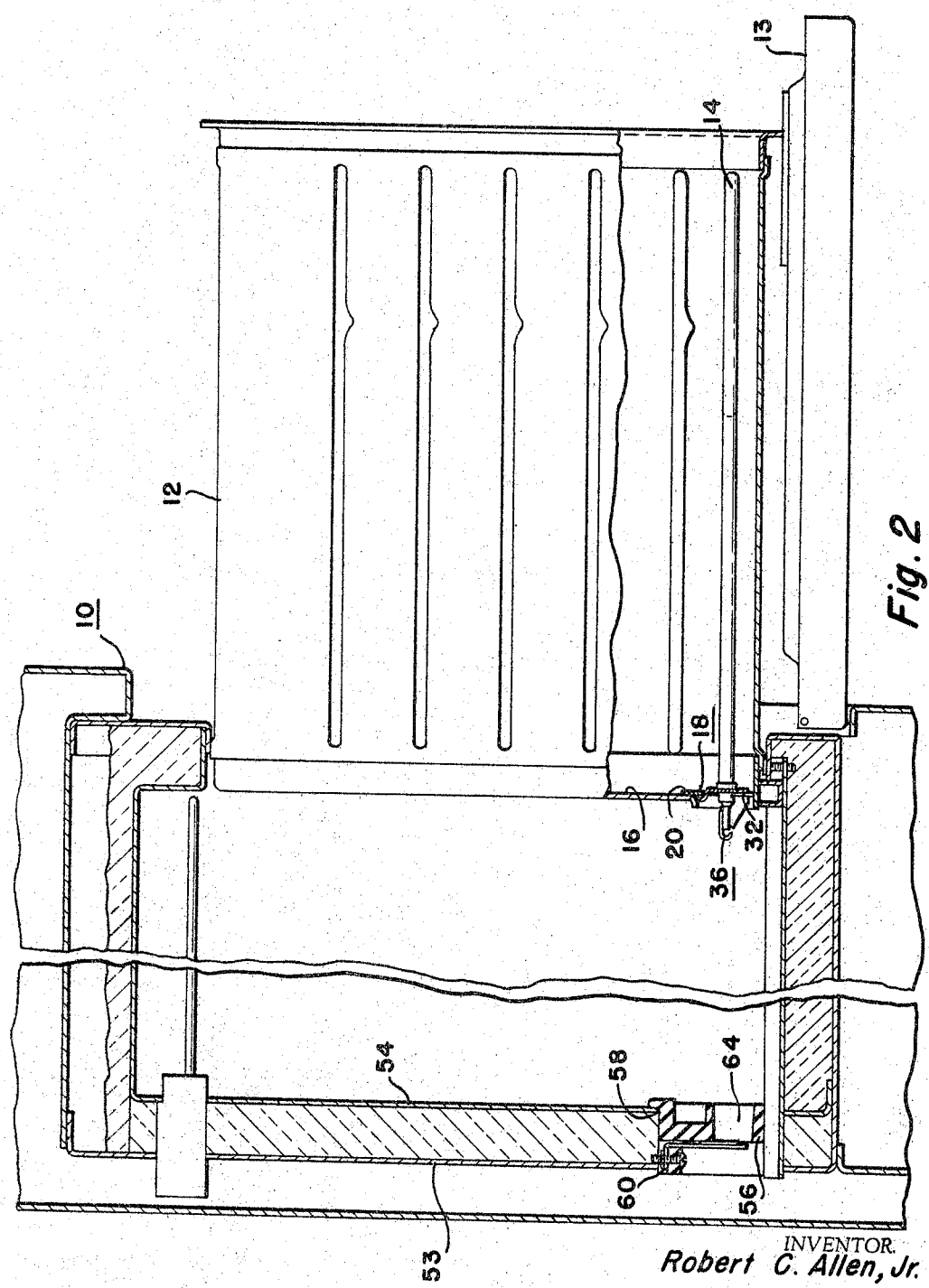

Aug. 1, 1967  R. C. ALLEN, JR  3,334,215
DOMESTIC ELECTRICAL APPLIANCE
Filed Oct. 4, 1963  4 Sheets-Sheet 3

INVENTOR.
Robert C. Allen, Jr.
BY Frederick M. Ritchie
His Attorney

INVENTOR.
Robert C. Allen, Jr.
BY
His Attorney

United States Patent Office 3,334,215
Patented Aug. 1, 1967

3,334,215
DOMESTIC ELECTRICAL APPLIANCE
Robert C. Allen, Jr., Trotwood, Ohio, assignor to General Motors Corporation, Detroit, Mich., a corporation of Delaware
Filed Oct. 4, 1963, Ser. No. 313,817
5 Claims. (Cl. 219—404)

This invention relates to a domestic appliance and more particularly to a hinged snap-up, snap-down, heating element for an oven liner.

Recent design innovations in the manufacture of electric ranges have recognized the desirability of easy to clean ovens. For instance, the patents to Fry 3,036,192 and myself 3,036,193, both issued May 22, 1962, teach the cleaning advantages to be derived by making the oven liner removable. With the structure in these patents, the cleaning of grease spatter from the inner walls of the liner is greatly facilitated by pulling the oven liner out of the range casing where it can be supported on the oven door. In these prior art designs, however, the bake heating element obstructs the cleaning of the bottom wall of the oven liner and, if it is removed, the terminal ends thereof are exposed to possible damage. Moreover, the handling of electrical elements is objectionable to most housewives. This invention, then, is directed to a bake heating element which is permanently hinged to the oven liner but which is adapted to be snapped into an upper retained position to expose the bottom wall of the oven line for cleaning.

Accordingly, it is an object of this invention to provide an oven heating element which is hingedly supported in the oven for movement between a raised position for cleaning the oven and a lower position for cooking in said oven.

Another object of this invention is the provision of a hinged heating element in a removable oven liner, both of which are movable to cleaning positions, said heating element being de-energizable when either the heating element or the oven liner is in said cleaning positions.

A still further object of this invention is to provide in an oven liner a pivotally supported heating element including detent means for snap positioning the heating element.

Further objects and advantages of the present invention will be apparent from the following description, reference being had to the accompanying drawings wherein a preferred embodiment of the present invention is clearly shown.

In the drawings:

FIGURE 2 is a fragmentary side sectional view, partly in elevation, showing the oven liner in its outer cleaning position with a bake heating element connected thereto and movable therewith for deenergizing said heating element;

Figure 1:
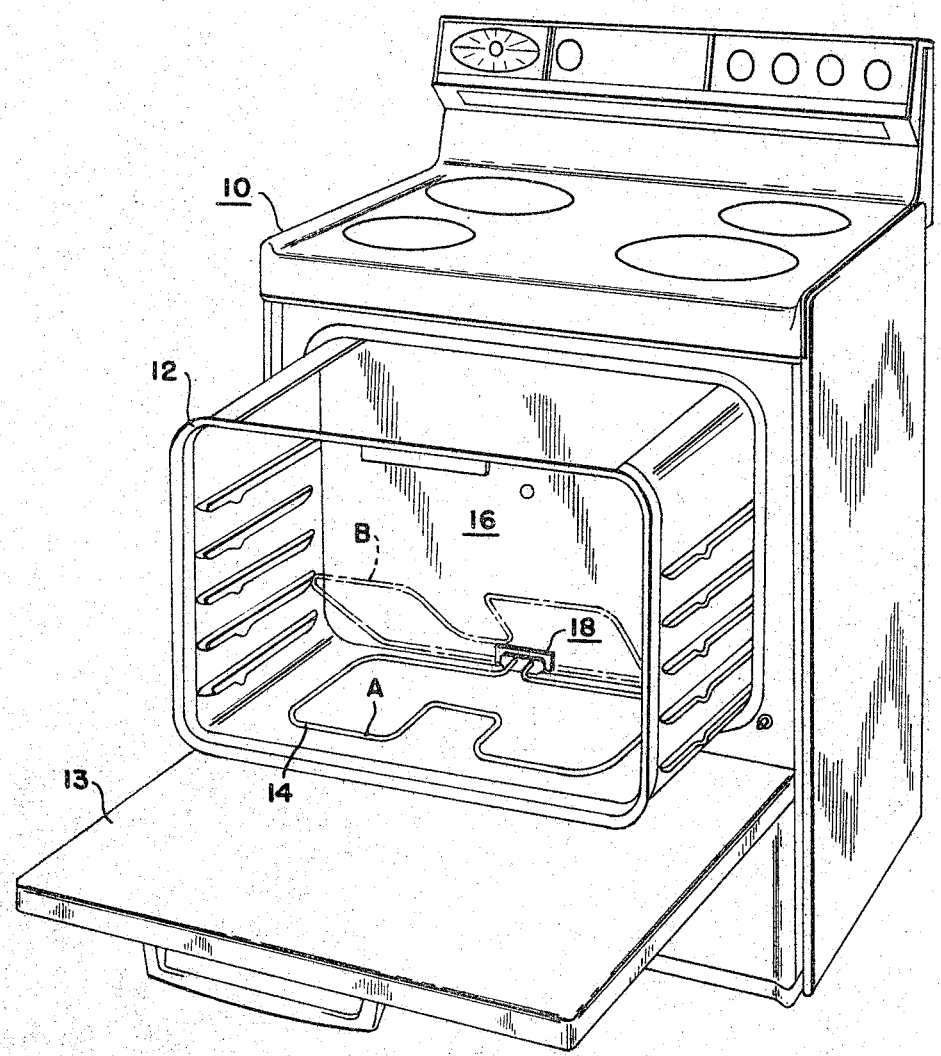
FIGURE 1 is a perspective view of an electric range oven including a removable oven liner.

In accordance with this invention and with reference to FIGURE 1, a hinged snap-up bake unit 14 is shown in combination with a removable oven liner 12 to facilitate cleaning of said oven liner. The bake unit has a snap-up pivotally retained raised position (phantom line) to expose the bottom wall of the oven and a snap-down position (solid line) for heating in said oven. In general, the downward pivotal movement of the heating element will cause the terminal ends thereof to engage power supply contacts to the rear of the oven liner.

More particularly, an electric range 10 is shown with a removable oven liner 12 supported at its front end on a horizontally hinged oven door 13. In the bottom of said liner a bake unit or heating element 14 is shown in solid line in a lower operating position A and in a pivotally raised oven liner cleaning position B. The heating element is supported on the rear wall 16 of the oven liner by a hinge arrangement, shown generally at 18.

Turning now to FIGURES 4, 5, 6 and 7, the hinge arrangement 18 is shown comprised of a sheet metal bake unit hinge plate or first hinge member 20 adapted to be fastened by screws 22 to the rear wall 16 of the oven liner. The hinge plate 20 has an elongated upper slot 24 and a lower notch or cutout portion 26, the sides of which are bent rearwardly to form stop tabs 28 and 30. Mating with the hinge plate 20 is a second sheet metal plate forming a second hinge member 32. The hinge member 32 has an S-shaped or offset tang 34 which interlocks with the slot 24 on the first hinge member 20 to form a hinge axis. The second hinge member 32 carries in fixed relationship thereto the terminal ends 36 and 38 of the heating element 14. Below the attachment of the terminal ends with the second hinge member plate 32 and riveted thereto, as at 40, is a U-shaped spring metal detent bracket 42. The detent bracket 42 is formed with identical yieldable side sections 44, 46. Taking side section 46 as representative, a first stop section 48 engages with stop tab 30 to retain the heating element 14 in a lower cooking or operating position (FIG. 6), while a second stop section 50, separated from the first stop section by a rib 51, engages with stop tab 30 for retaining the heating element in a pivotally raised position (FIG. 7) to clear the bottom wall of the oven liner for cleaning thereof.

Figure 4:
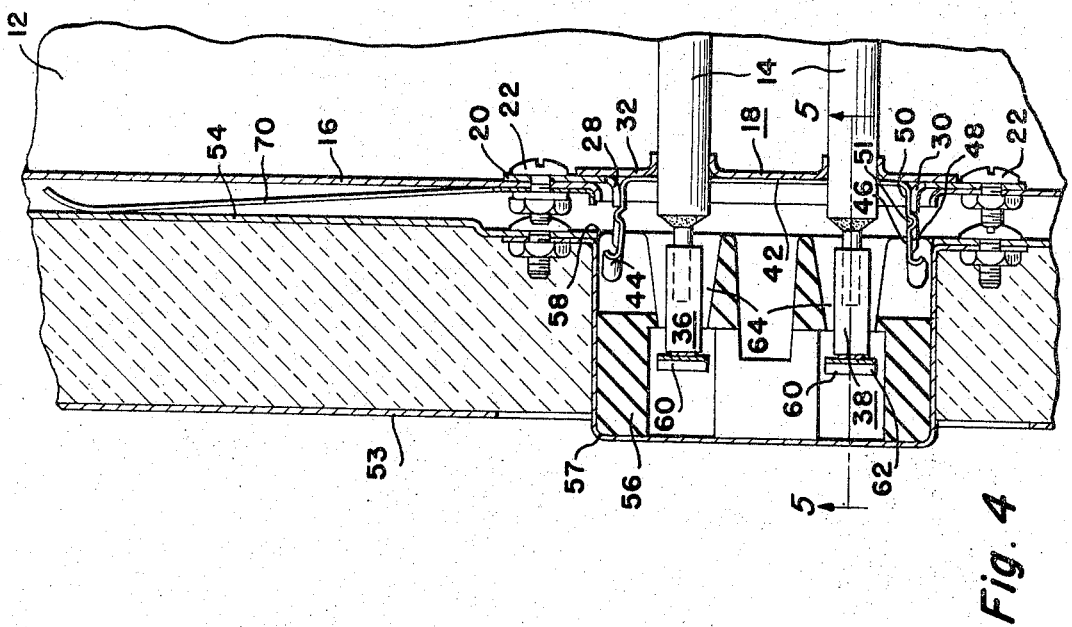
FIGURE 4 is a fragmentary top sectional view taken along line 4—4 in FIGURE 3 showing the heating element in its energizable position electrically connected to a power supply terminal block and grounded to the range casing.
Figure 3:
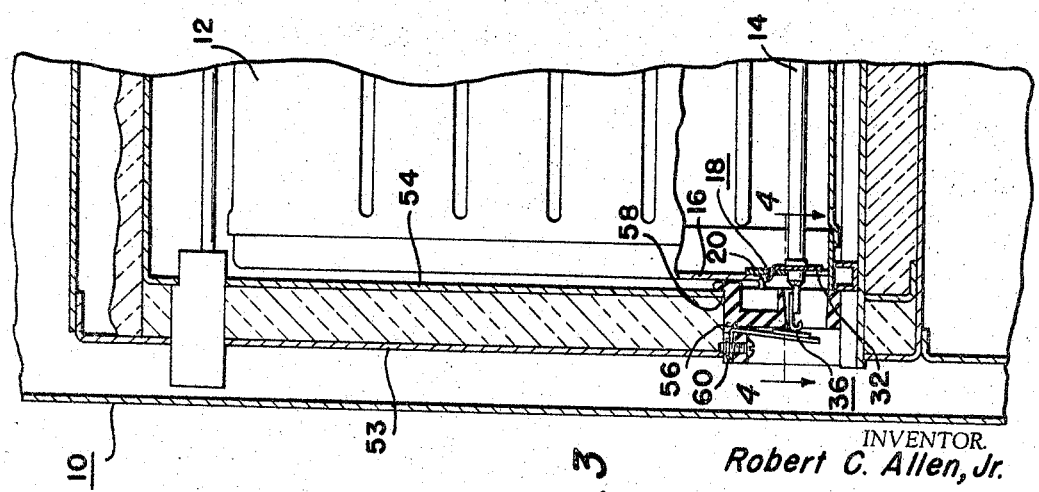
FIGURE 3 is a fragmentary side sectional view similar to FIGURE 2 showing the oven liner in its cooking position and the bake heating element in its energizable position.
Figure 5:
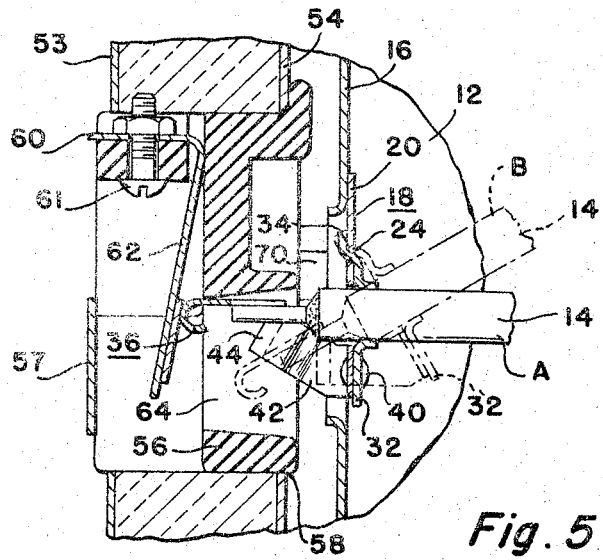
FIGURE 5 is a fragmentary side sectional view taken along line 5—5 in FIGURE 4 showing in solid line the hingedly supported oven heating element in its energizable cooking position and in phantom line the oven heating element in its electrically disconnected cleaning position.
Figure 6:
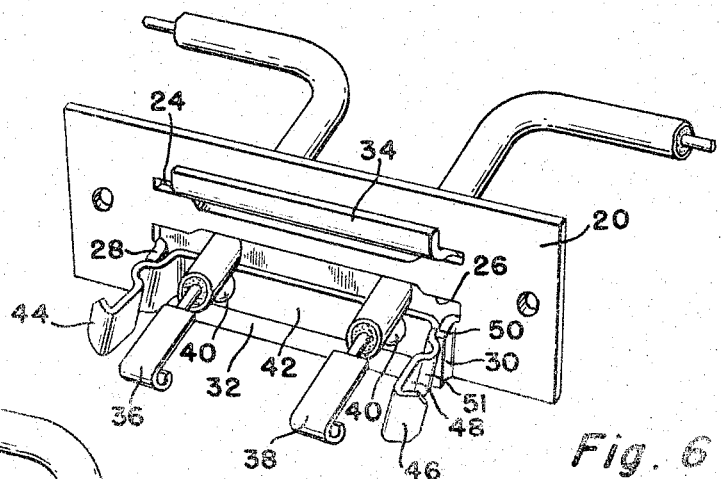
FIGURE 6 is a fragmentary perspective view of the hinge support arrangement for an oven heating element with the element in its lower cooking position.
Figure 7:
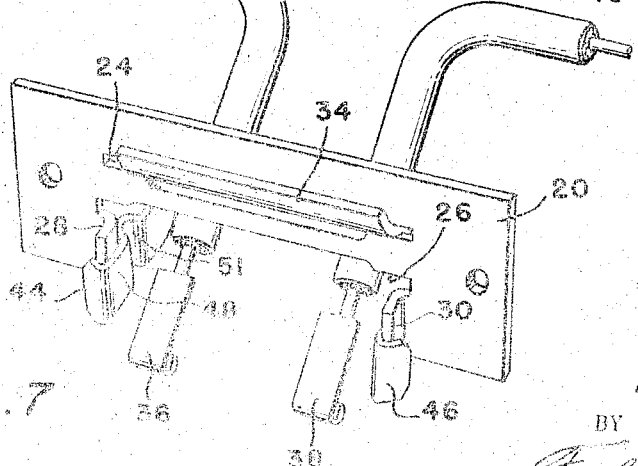
FIGURE 7 is a fragmentary perspective view of the hinge support arrangement for an oven heating element with the element in its raised cleaning position.

The selective electrical connection of the heating element with a power supply is best seen in FIGURES 4 and 5. The range 10 includes a casing 53, one part of which is an insulation retainer 54 in juxtaposition to the rear wall 16 of the oven liner 12. An electrical terminal block 56 is supported on the range casing by a retainer 57 adjacent an opening 58 in the insulation retainer portion 54. L-shaped leaf spring electrical contacts, such as 60, are fastened to the terminal block 56 as at 61 and include a yieldable leg portion 62 depending in front of an opening or passage 64 in the terminal block. Thus, when the heating element 14 moves from its raised position B (phantom line) to its lower position A (solid line), the terminal ends thereof, such as 36, pivotally slidably engage the yieldable electrical contacts, such as 62, thereby insuring a good electrical connection therewith.

Where the hinged heating element is to be used with a fixed liner in accordance with the teaching of this invention, any suitable ground connection may be permanently installed. Where, however, a removable oven liner is to be used, another form of ground connection, best seen in FIGURE 4, may be used. A spring finger 70 is attached by the screw 22 to the rear wall 16 of the oven liner in firm electrical connection therewith. Thus, when the oven liner 12 is slid to its inner cooking position, the finger 70 electrically connects with the metal insulation retainer 54 to ground the electrical heating element 14.

It should now be seen that an improved heating element support arrangement has been provided for oven liners of either the fixed or removable variety. Pivotal snap positioning of the heating element will not only retain the element in an out-of-the way location so the oven can be cleaned easily, but such pivotal movement will also electrically disconnect the element to prevent energization thereof. Moreover, where the support arrangement of this invention is used with removable oven liners, the movement of the heating element and the oven liner to their respective cooking positions will automatically condition the heating element for energization thereof.

While the embodiment of the present invention as herein disclosed constitutes a preferred form, it is to be understood that other forms might be adopted.

What is claimed is as follows:

1. In combination with an oven liner having a heating element disposed within the cavity defined by the interior walls of the oven liner, a hinge support arrangement for said heating element including a first hinge member fastened to said oven liner and having an elongated slot and a notch below said slot, a yieldably positionable second hinge member in pivotally cooperable relationship with said first hinge member and having affixed thereto the terminal end of said heating element, said second hinge member including an offset tang portion insertable into the slot of said first hinge member to form therewith by hanging thereon a hinge axis, said offset tang portion extending behind said first hinge member above said slot as the sole means to retain said second hinge member in hinged relationship to said first hinge member, a U-shaped detent bracket on said second hinge member having a pair of parallel side sections yieldably selectively engageable with the opposite sides of said notch outboard of said terminal end of said heating element as said terminal end moves arcuately through said notch, each of said side sections having a first stop portion engageable with the respective side of said notch for positioning said heating element in a lower portion for cooking in said oven and having a second stop portion engageable with the respective side of said notch for retaining said heating element in a raised position for cleaning said oven.

2. The combination of claim 1 including a terminal block having a passageway adjacent the notch in said first hinge member and sufficiently close thereto to receive therethrough the terminal end of said heating element as said heating element is moved from said raised position to said lower position, said terminal block having a leaf spring contact means at one end of said passageway in the path of said terminal end and engageable therewith as the heating element moves to said lower position, and disengageable therefrom as the heating element moves to said raised position.

3. The combination of claim 2 wherein said oven liner is slidably removable with respect to said terminal block, said terminal end of said heating element being disengageable from said leaf spring means when said oven liner is removed irrespective of whether said heating element is in said raised or lowered position.

4. A hinge arrangement for an oven heating element including a first hinge member having first and second openings, and a yieldably positionable second hinge member in pivotally cooperable relationship to said first hinge member and adapted to carry a heating element in a manner to facilitate movement of a terminal end thereof through said second opening, said second hinge member including an offset tang portion insertable into the first opening of said first hinge member to form therewith by hanging thereon a hinge axis and having a detent portion yieldably selectively engageable with the second opening of said first hinge member when the said terminal end of said heating element moves through said second opening, said detent having a first stop relationship with said second opening adapted for positioning said heating element in a lower position and a second stop relationship with said second opening adapted for retaining said heating element in a raised position, and said offset tang portion extending behind said first hinge member above said first opening as the sole means to retain said second hinge member in hinged relationship to said first hinge member.

5. A hinge arrangement for an oven heating element including a first hinge member having first and second openings, and a yieldably positionable second hinge member in pivotally cooperable relationship to said first hinge member and adapted to carry a heating element in a manner to facilitate movement of a terminal end thereof through said second opening, said second hinge member including an offset tang portion insertable into the first opening of said first hinge member to form therewith by hanging thereon a hinge axis, one of said hinge members having a detent portion yieldably selectively engageable with the other of said hinge members when the said terminal end of said heating element moves through said second opening, said detent having a first stop relationship with said other of said hinge members adapted for positioning said heating element in a lower position and a second stop relationship with said other of said hinge members adapted for retaining said heating element in a raised position, and said offset tang portion extending behind said first hinge member above said first opening as the sole means to retain said second hinge member in hinged relationship to said first hinge member.

References Cited

UNITED STATES PATENTS

| | | | |
|---|---|---|---|
| 1,637,435 | 8/1927 | Brown | 219—404 |
| 2,824,944 | 2/1958 | Ammerman | 219—403 |
| 2,828,403 | 3/1958 | Ammerman | 219—403 |
| 3,016,445 | 1/1962 | Lien | 219—451 |
| 3,017,490 | 1/1962 | McOrlly et al. | 219—451 |
| 3,036,192 | 5/1962 | Fry | 219—403 X |
| 3,146,338 | 8/1964 | Seremak | 219—404 X |
| 3,162,754 | 12/1964 | Jasionowski | 219—403 |
| 3,171,946 | 3/1965 | Ammerman | 219—404 |
| 3,171,947 | 3/1965 | McOrlly | 219—404 |

RICHARD M. WOOD, Primary Examiner.

ANTHONY BARTIS, Examiner.

C. L. ALBRITTON, Assistant Examiner.